United States Patent
Brikis et al.

(10) Patent No.: US 12,105,749 B2
(45) Date of Patent: Oct. 1, 2024

(54) METHOD FOR GENERATING TRIPLES FROM LOG ENTRIES

(71) Applicant: Siemens Aktiengesellschaft, Munich (DE)

(72) Inventors: Georgia Olympia Brikis, Plainsboro, NJ (US); Dmitry Fradkin, Wayne, PA (US); Vladimir Lavrik, Hessen (DE); Serghei Mogoreanu, Munich (DE); André Scholz, Ansbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/782,040

(22) PCT Filed: Dec. 10, 2020

(86) PCT No.: PCT/EP2020/085402
§ 371 (c)(1),
(2) Date: Jun. 2, 2022

(87) PCT Pub. No.: WO2021/116240
PCT Pub. Date: Jun. 17, 2021

(65) Prior Publication Data
US 2023/0004591 A1    Jan. 5, 2023

(30) Foreign Application Priority Data
Dec. 13, 2019 (EP) .................... 19215894

(51) Int. Cl.
*G06F 16/00* (2019.01)
*G06F 16/35* (2019.01)
(Continued)

(52) U.S. Cl.
CPC ............ *G06F 16/355* (2019.01); *G06F 17/40* (2013.01); *G06N 5/022* (2013.01)

(58) Field of Classification Search
CPC ...... G06F 16/355; G06F 17/40; G06F 40/279; G06N 5/022
See application file for complete search history.

(56) References Cited

U.S. PATENT DOCUMENTS

| 2014/0236575 A1 | 8/2014 | Tur et al. |
| 2017/0185576 A1 | 6/2017 | Agarwal et al. |

(Continued)

OTHER PUBLICATIONS

Gainaru, Ana et al: "Event Log Mining Tool for Large Scale HPC Systems", Aug. 29, 2011, Pervasive: International Conference on Pervasive Computing; [Lecture Notes in Computer Science; Lect. Notes Computer], Springer, Berlin, Heidelberg, pp. 52-64, XP019161726, ISBN: 978-3-642-17318-9; 2011.

(Continued)

*Primary Examiner* — Jared M Bibbee
(74) *Attorney, Agent, or Firm* — Schmeiser, Olsen & Watts LLP

(57) ABSTRACT

A computer-implemented method, computer program product, and a technical system for generating triples including
    providing a plurality of log entries from respective log files, wherein each log entry of the plurality of log entries includes at least one text message,
    generating at least one template based on the plurality of log entries using unsupervised clustering, wherein the at least one template includes at least one variable part and at least one fixed part,
    assigning each log entry of the plurality of log entries to one respective template based on the generated at least one template using a similarity measure,
    extracting the corresponding at least one variable and at least one fixed part of each text message of the plurality of text messages as key/value pairs using the respective assigned at least one template based on the plurality of log entries, and (Continued)

Figure 1:
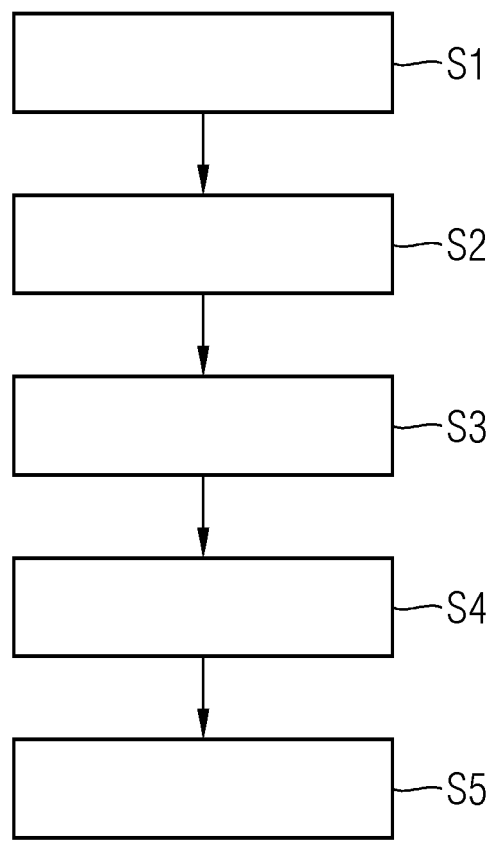

providing the text messages, keys and values as triples.

6 Claims, 2 Drawing Sheets

(51) Int. Cl.
*G06F 17/40* (2006.01)
*G06N 5/022* (2023.01)

(56) References Cited

U.S. PATENT DOCUMENTS

2017/0300532 A1 10/2017 Simhon et al.
2018/0082183 A1 3/2018 Hertz et al.

OTHER PUBLICATIONS

Pi, Aidi et al: "It Can Understand the Logs, Literally", 2019 IEEE International Parallel and Distributed Processing Symposium Workshops (IPDPSW), IEEE, May 20, 2019, pp. 446-451, XP033583425, DOI: 10.1109/IPDPSW.2019.00084; 2019.
Li, Yuanchun et al: "Automated Extraction of Personal Knowledge from Smartphone Push Notifications", arxiv.org, Cornell University Library, 201 OLIN Library Cornell University Ithaca, NY 14853, Aug. 6, 2018, pp. 1-13, XP080903701; 2018.
PCT International Search Report and Written Opinion of International Searching Authority mailed Mar. 5, 2021 corresponding to PCT International Application No. PCT/EP2020/085402 filed Dec. 10, 2020.

METHOD FOR GENERATING TRIPLES FROM LOG ENTRIES

CROSS-REFERENCE TO RELATED APPLICATIONS

This application claims priority to PCT Application No. PCT/EP2020/085402, having a filing date of Dec. 10, 2020, which claims priority to EP Application No. 19215894.7, having a filing date of Dec. 13, 2019, the entire contents both of which are hereby incorporated by reference.

FIELD OF TECHNOLOGY

The following relates to a computer-implemented method for generating triples from log entries. Further, the following relates to a corresponding computer program product and technical system.

BACKGROUND

The amount of data or data volume is still increasing until now. The data can include human- and machine-generated data. This large or voluminous data is known under the terms "big data" or "large scale data". Especially, the digital data will substantially grow in the next years in view of the digital transformation.

Thus, the importance of automated large scale data analysis or data processing will gain in importance since the manual analysis becomes unfeasible for the experts. This analysis or processing paradigm encompasses a series of different methods and systems to process big data. Big data challenges include in particular capturing data, data storage, data analysis, search, sharing, transfer, visualization, querying, updating, information privacy and data source.

Considering complex industrial plants, the industrial plants usually comprise distinct parts, modules or units with a multiplicity of individual functions. Exemplary units include sensors and actuators. The units and functions have to be controlled and regulated in an interacting manner. They are often monitored, controlled and regulated by automation systems, for example the Simatic S7 system of Siemens AG. The units can either exchange data directly with one another or communicate via a bus system with one another and with a master control unit, if the plant has such a unit. The units are connected to the bus system via parallel or, more often, serial interfaces.

A large amount of log files is generated during operation of such industrial plants. Each log file comprises one or more log entries and has a different structure or format depending on the computing unit, program or process it was generated by. Log mining tasks struggle with the variety of log file structures, formats and types that can be found in heterogenous computer systems, such as the aforementioned industrial plants. Exemplary tasks include the identification of anomalies in the log entries, comparison of the log files from one industrial plant over time, extraction of log files and/or extraction of relevant information from the log files of different industrial plants.

According to prior art, users or experts have to manually analyze the huge amount of log files and to extract the relevant information from their log entries. However, such manual approaches rely on expert knowledge and require a lot of manual effort. Thus, they are error-prone, time consuming and expensive.

Alternatively, information extraction can be accomplished automatically with e.g. regular expressions, which are known from the prior art. However, the patterns have to be defined and tested by an expert based on expert knowledge. A disadvantage is that the definition, testing and pattern matching is error prone and time-consuming.

Further, IncMap is known from the prior art for mapping elements from a data source e.g. log entries to concepts and relationships in ontologies. IncMap performs a recurrent ad-hoc mapping with user feedback. However, this approach requires a structured or relational data base as data source and the ontology as basis for mapping. Thus, the disadvantage is that the definition of the ontology has to be established beforehand in a time-consuming and error-prone manner.

An aspect relates to provide a computer-implemented method for generating triples from log entries in an efficient and reliable manner.

SUMMARY

This problem is according to one aspect of embodiments of the invention solved by computer-implemented method for generating triples from log entries, comprising the steps of:
a. Providing a plurality of log entries from respective log files; wherein each log entry of the plurality of log entries comprises at least one text message;
b. Generating at least one template based on the plurality of log entries using unsupervised clustering; wherein the at least one template comprises at least one variable part and at least one fixed part;
c. Assigning each log entry of the plurality of log entries to one respective template based on the generated at least one template using a similarity measure;
d. Extracting the corresponding at least one variable and at least one fixed part of each text message of the plurality of text messages as key/value pairs using the respective assigned at least one template based on the plurality of log entries; and
e. Providing the text messages, keys and values as triples.

Accordingly, embodiments of the invention are directed to a computer-implemented method for generating triples from log entries.

Knowledge graphs are known from the prior art as graph-structured databases. The triples are the elementary units of a knowledge graph. The triple can be defined as subject-predicate-object, often denoted as (head, relation, tail), (s, p, o) or (h, r, t). Each triple defines one connection between two entities in the knowledge graph.

In a first step, the log entries of log files are provided as input. During operation, a computing unit or technical system generates a huge amount of log files, comprising respective log entries with their text messages. Thereby, each log entry comprises at least one text message. The text messages of these log entries are used for the further method steps.

Furthermore, each log entry can comprise additional elements or information, such as time stamp, indicators of the computing unit, technical system, subsystem or component e.g. where it was generated.

In a second step, after the reception of the input data set, one or more templates are determined from the text messages by means of unsupervised clustering on the basis of the received input data set. According to an embodiment, unsupervised clustering is used for the task of topic modelling. In more detail, a one-pass density clustering algorithm based on Jaccard distance and a bag-of-words model can be used to represent the messages. The advantage is that no supervision or human intervention is required. Further, this algorithm can handle log entries produced by arbitrary software processes.

In other words, the log entries are instances of a log entry template or template. This means that the text message of the log entry consists partly of a fixed text and partly of dynamically generated values, thus two parts. For example, the log entry template can be expressed as "Unable to open file % s", whereas the part "Unable to open file" is the fixed part and "% s" is the variable part. The actual instances have specific file paths in the message text.

In a third step, after the generation of the templates, the templates are applied on the log messages using a similarity measure. In other words, similar text messages are clustered and assigned to the same or common template. Thus, they are classified as the same template. According to an embodiment, a distance measure is used as similarity measure, such as the Jaccard distance measure.

In a further step, key/value pairs are extracted from the text messages using the corresponding generated templates.

In a last step, the text messages, keys and values are provided as triples. The triples comprise the connections between the entities.

In more detail, the text message is in relation or connection to the value. The text message and the value are the entities. The relation or connection between the entities is the key. More precisely, the subject is the message, the predicate is the key and the object is the value.

The method according to embodiments of the invention ensures an improved generation of triples from log files since the triples are automatically generated from the log entries.

The resulting output data is more reliable and less error-prone compared to prior art. This way, the output data and in particular the triples can serve as improved basis for more efficient use cases, which are built on the reliable output data. In particular, the triples can be loaded into a knowledge graph in an efficient manner, see further below. The knowledge graph serves as common data base for further analyses on the heterogeneous data.

The manual effort by experts, such as the construction of an ontology, conception of mapping rules from log entries to entities in the ontology can be reduced or even prevented.

In contrast to prior art, the method is applicable on unseen or unexpected text messages, which are similar to already existing ones.

In one aspect the triples are an input data set for log mining or any other further analysis.

Accordingly, the output of the method or result in the form of the triples can be used for distinct tasks. Thereby, the knowledge graph is important for diagnosis and repair of problems in an industrial environment e.g. industrial plants. In other words, the method allows the transformation of a set or collection of diverse log files from computing units or systems into a knowledge graph. Thus, the problems e.g. defects or failures of industrial plants can be detected and handled in an efficient and timely manner. Further, the method allows for an increased system uptime and reduced maintenance costs due to the improved earlier detection.

Additionally, or alternatively, the method or result in the form of the triples can be used for products and/or services to support the customers or other users by analyzing their industrial plants, devices or other technical units. This support leads to e.g. an increase in the number of sales of the respective products and/or services.

In a further aspect the method comprises the further step of loading the input data set into a knowledge graph.

A further aspect of embodiments of the invention is a computer program product (non-transitory computer readable storage medium having instructions, which when executed by a processor, perform actions) directly loadable into an internal memory of a computer, comprising software code portions for performing the steps according to the aforementioned method when said computer program product is running on a computer.

A further aspect of embodiments of the invention is a technical system for generating triples, comprising:
a. Receiving unit for providing a plurality of log entries from respective log files;
   wherein each log entry of the plurality of log entries comprises at least one text message;
b. Clustering unit for
   generating at least one template based on the plurality of log entries using unsupervised clustering; wherein the at least one template comprises at least one variable part and at least one fixed part and
   Assigning each log entry of the plurality of log entries to one respective template based on the generated at least one template using a similarity measure;
d. Triple extracting unit for extracting the corresponding at least one variable and at least one fixed part of each text message of the plurality of text messages as key/value pairs using the respective assigned at least one template based on the plurality of log entries; and
e. Transmitting unit for providing the text messages, keys and values as triples.

The units may be realized as any devices, or any means, for computing, in particular for executing a software, an app, or an algorithm. For example, the units may consist of or comprise a central processing unit (CPU) and/or a memory operatively connected to the CPU. The units may also comprise an array of CPUs, an array of graphical processing units (GPUs), at least one application-specific integrated circuit (ASIC), at least one field-programmable gate array, or any combination of the foregoing. The units may comprise at least one module which in turn may comprise software and/or hardware. Some, or even all, modules of the units may be implemented by a cloud computing platform.

BRIEF DESCRIPTION

Figure 2:
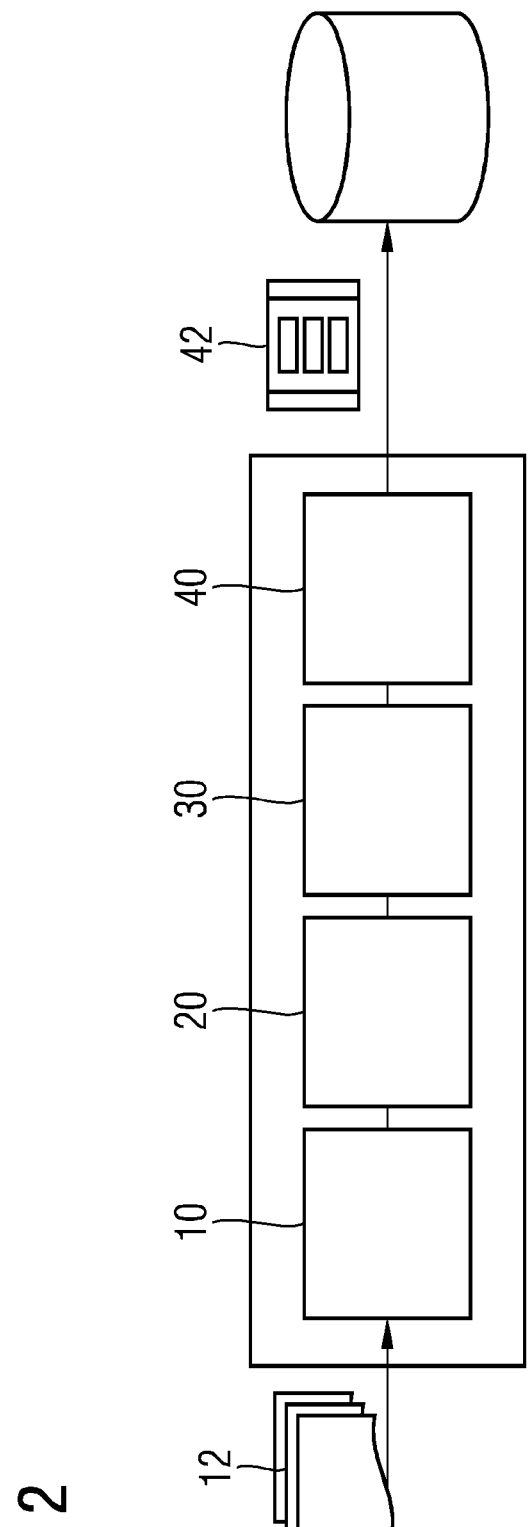

Some of the embodiments will be described in detail, with reference to the following figures, wherein like designations denote like members, wherein:

FIG. 1 illustrates a flowchart of the method according to an embodiment of the invention; and FIG. 2 illustrates a technical system according to an embodiment of the invention.

DETAILED DESCRIPTION

FIG. 1 illustrates a flowchart of the method according to embodiments of the invention. The method for generating triples, comprises the following steps S1 to S5:
a. In a first step a plurality of log entries 12 is provided. The log entries are derived from respective log files S1. Each log entry comprises one or more text messages. The first step can be performed by a receiving unit 10.
b. In a second step at least one template is generated based on the plurality of log entries using unsupervised clustering S2. Each template comprises at least one variable part and at least one fixed part. The second step can be performed by a clustering unit. The clustering unit can be equally referred to extracting unit 20.

c. In a third step each log entry of the plurality of log entries is assigned to one respective template based on the generated at least one template using a similarity measure S3. The third step can be performed by the same clustering unit or another clustering unit 20.
d. In a further step the corresponding at least one variable and at least one fixed part of each text message of the plurality of text messages are extracted as key/value pairs using the respective assigned at least one template based on the plurality of log entries 12. This step can be performed by a triple extracting unit 30.
e. In a last step the text messages, keys and values are provided as triples 42. This last step can be performed by a transmitting or sending unit 40. The aforementioned units of the technical system can be also referred to as modules.

FIG. 2 illustrates an exemplary technical system 1 with the aforementioned units 10 to 40. The resulting triples are loaded into a knowledge graph according to this embodiment.

Clustering According to Steps S2 and S3

The step S2, the templates are generated based on different log messages with usage of unsupervised clustering. Each template consists of fixed and variable parts. Exemplary templates are listed in the following:
Log message: "Software McAfee tries to reach IP address 139.136.55.1"
Template: "Software <*> tries to reach IP address <*>"
Log message: "Software McAfee Solidifier detected deletion of C:\temp\test.vbs"
Template: "Software <*> detected deletion of <*>"

In step S3, similar text messages are classified as the same template, e.g. similar in the manner that the fixed parts are the same, variable parts are not the same, but have the same structure and/or length.

Exemplary templates and a list of log entries with their corresponding templates are listed in the following:
Template: "Software <*> tries to reach IP address <*>"
Log messages:
"Software McAfee tries to reach IP address 139.136.55.1"
"Software Symantec Endpoint Protection tries to reach IP address 138.136.55.10"
Template: "Software <*> detected deletion of <*>"
Log messages:
"Software McAfee Solidifier detected deletion of C:\temp\test.vbs"
"Software ACME Detector detected deletion of C:\temp\test2.vbs"

Triple Extracting According to Step S4

In step S4, the varying and the fixed parts of the different text messages are extracted according to the structure of the templates. For every varying part the fixed part before is extracted and listed as key/value pairs.

Exemplary key/value pairs after said extraction are listed in the following:
Key: "Software", Value: "McAfee"
Key: "tries to reach IP address", Value: "139.136.55.1"
Key: "Software", Value: "Symantec Endpoint protection"
Key: "tries to reach IP address", Value: "138.136.55.10"
Key: "Software", Value: "McAfee Solidifier"
Key: "detected deletion of", Value: "C:\temp\test.vbs"
Key: "Software", Value: "ACME Detector"
Key: "detected deletion of", Value: "C:\temp\test2.vbs"

Further, the key/value pairs of fixed and varying text message parts are connected to entities of the text message itself for the graph creation as exemplary use case.

Exemplary connections are listed in the following:
Create a connection "Software" from this message to the entity "McAfee"
Create a connection "triesToReachIPaddress" from this message to the entity "139.136.55.1", which could relate to a device
Create a connection "Software" from this message to the entity "McAfee Solidifier"
Create a connection "detectedDeletionOf" from this message to the entity "C:\temp\test.vbs"

Post-processing steps can be added after the generation of the triples before they are loaded into the knowledge graph, such as entity reconciliation e.g. nearly similar path names should be treated as the same entity.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating triples from log entries, the method comprising:
providing a plurality of log entries from respective log files generated during operation of one or more industrial plants, wherein each log entry of the plurality of log entries comprises at least one text message;
generating at least one template based on the plurality of log entries using unsupervised clustering, wherein the at least one template comprises at least one variable part and at least one fixed part;
assigning each log entry of the plurality of log entries to one respective template based on the generated at least one template using a similarity measure;
extracting the corresponding at least one variable and at least one fixed part of each text message of the plurality of text messages as key/value pairs using the respective assigned at least one template based on the plurality of log entries;
providing the text messages, keys and values as triples; and
loading the triples into a knowledge graph for analyzing the one or more industrial plants.

2. The method according to claim 1, wherein the triples are an input data set for log mining or any other further analysis.

3. The method according to claim 2, further comprises loading the input data set into a knowledge graph.

4. A computer program product, comprising a computer readable hardware storage device having computer readable program code stored therein, said program code executable by a processor of a computer system to implement a method according to claim 1 when the computer program product is running on a computer.

5. A technical system for generating triples from log entries, the technical system comprising:
one or more processors and a memory operatively connected to the one or more processors, the one or more processors configured to:
provide a plurality of log entries from respective log files generated during operation of one or more industrial plants, wherein each log entry of the plurality of log entries comprises at least one text message;

generate at least one template based on the plurality of log entries using unsupervised clustering, wherein the at least one template comprises at least one variable part and at least one fixed part;

assign each log entry of the plurality of log entries to one respective template based on the generated at least one template using a similarity measure;

extract the corresponding at least one variable and at least one fixed part of each text message of the plurality of text messages as key/value pairs using the respective assigned at least one template based on the plurality of log entries;

provide the text messages, keys and values as triples; and load the triples into a knowledge graph for analyzing the one or more industrial plants.

6. The method according to claim 1, wherein the knowledge graph is used for diagnosis and repair of problems in the one or more industrial plants.

\* \* \* \* \*